United States Patent
Yamaguchi et al.

(10) Patent No.: US 7,414,084 B2
(45) Date of Patent: Aug. 19, 2008

(54) FLUORORESIN POWDER COATING COMPOSITION AND ARTICLE HAVING COATING FILM

(75) Inventors: Masaru Yamaguchi, Chiba (JP); Sho Masuda, Chiba (JP); Masao Unoki, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 474 days.

(21) Appl. No.: 10/893,347

(22) Filed: Jul. 19, 2004

(65) Prior Publication Data

US 2004/0266914 A1 Dec. 30, 2004

Related U.S. Application Data

(63) Continuation of application No. PCT/JP03/00548, filed on Jan. 22, 2003.

(30) Foreign Application Priority Data

Jan. 22, 2002 (JP) .............................. 2002-012760

(51) Int. Cl.
*C09D 151/00* (2006.01)
*C08L 27/22* (2006.01)
*C08F 259/08* (2006.01)

(52) U.S. Cl. ................. 523/201; 524/519; 524/520; 525/199; 525/276; 525/326.2; 525/326.3

(58) Field of Classification Search ................. 523/201
See application file for complete search history.

(56) References Cited

U.S. PATENT DOCUMENTS

| | | | | |
|---|---|---|---|---|
| 4,469,846 A | * | 9/1984 | Khan et al. | 525/72 |
| 4,544,720 A | * | 10/1985 | Ohmori et al. | 526/247 |
| 4,931,505 A | * | 6/1990 | Miyazaki et al. | 525/125 |
| 5,030,667 A | * | 7/1991 | Shimizu et al. | 523/201 |
| 5,147,934 A | | 9/1992 | Ito et al. | |
| 5,439,896 A | | 8/1995 | Ito et al. | |
| 5,494,752 A | * | 2/1996 | Shimizu et al. | 428/407 |
| 5,707,763 A | * | 1/1998 | Shimizu et al. | 429/217 |
| 7,183,356 B2 | * | 2/2007 | Ishida | 525/199 |

FOREIGN PATENT DOCUMENTS

| | | |
|---|---|---|
| EP | 0 869 157 A1 | 10/1998 |
| JP | 48-28550 | 4/1973 |
| JP | 50-51539 | 5/1975 |
| JP | 51-57725 | 5/1976 |
| JP | 51-82321 | 7/1976 |
| JP | 63-264675 | 11/1988 |
| JP | 1-103670 | 4/1989 |
| JP | 7-188587 A | 7/1995 |
| JP | 9-12926 A | 1/1997 |
| JP | 2000-160061 A | 6/2000 |

OTHER PUBLICATIONS

U.S. Appl. No. 10/893,347, filed Jul. 19, 2004, Yamauchi et al.
U.S. Appl. No. 10/799,734, filed Mar. 15, 2004, Asakawa et al.
U.S. Appl. No. 10/806,103, filed Mar. 23, 2004, Asakawa et al.
U.S. Appl. No. 10/807,166, filed Mar. 24, 2004, Ishida.

* cited by examiner

*Primary Examiner*—James J. Seidleck
*Assistant Examiner*—Vickey Ronesi
(74) *Attorney, Agent, or Firm*—Oblon, Spivak, McClelland, Maier & Neustadt, P.C.

(57) ABSTRACT

A composition which can improve impact resistance of a coating film while maintaining superior weather resistance and gloss of the coating film of a fluororesin powder coating material is provided. A fluororesin powder coating composition containing the following particles (C) in an amount of from 0.1 to 10 parts by mass per 100 parts by mass of a fluororesin. The particles (C) are particles having a core/shell structure and having an average particle size of from 0.01 to 2.5 µm, wherein the core and/or at least one shell comprises a fluorinated polymer.

19 Claims, No Drawings

FLUORORESIN POWDER COATING COMPOSITION AND ARTICLE HAVING COATING FILM

TECHNICAL FIELD

The present invention relates to a fluororesin powder coating composition and an article having a coating film formed from the composition.

BACKGROUND ART

A powder coating material has a feature that it is solvent free, and its application range has been expanded in recent years, as consciousness for environmental protection has increased. Especially, a fluororesin powder coating material is capable of meeting a demand for maintenance-free by virtue of the weather resistance performance which the fluororesin specifically has, and its applications are expected to increase.

Of a coating film comprising a fluororesin powder coating material, one feature is a high surface hardness. On the other hand, the impact strength of the coating film is poor as compared with a powder coating material comprising a polyester.

It has been known to add particles having a so-called core/shell structure to a powder coating material comprising e.g. a polyester in order to improve impact resistance. However, if such conventionally known particles having a core/shell structure are added to a powder coating material containing a fluororesin as the main component, since the weather resistance performance of the particles is inferior to the weather resistance performance of the fluororesin, weather resistance performance of the coating film tends to deteriorate resultingly. Further, the gloss tends to be low since the refractive indices of the fluororesin and the particles are significantly different, and characteristics of the powder coating material containing a fluororesin as the main component can not adequately be exhibited. Further, since dispersibility of the particles into the fluororesin is inadequate, the effect of improving the impact resistance tends to be inadequate.

The present invention has been made to overcome the above drawbacks, and it is an object of the present invention to provide a composition which can improve impact resistance of a coating film while maintaining superior weather resistance of a fluororesin powder coating material and gloss of the coating film.

DISCLOSURE OF THE INVENTION

The present invention is characterized by the following gists.

(1) A fluororesin powder coating composition containing a fluororesin (B) as the main component, which contains the following particles (C) in an amount of from 0.1 to 10 parts by mass per 100 parts by mass of the fluororesin (B):

particles (C): particles having a core/shell structure comprising a core and at least one shell and having an average particle size of from 0.01 to 2.5 μm, wherein at least one shell and/or the core comprises a fluorinated polymer (A), provided that the average particle size is a weight average particle size measured by dynamic light scattering.

(2) The fluororesin powder coating composition according to (1), wherein the fluororesin (B) is a resin comprising a copolymer obtained by copolymerization of a fluoromonomer having an ethylenic unsaturated group in a proportion of from 30 to 70 mol %.

(3) The fluororesin powder coating composition according to (1) or (2), wherein the fluororesin (B) is a thermosetting fluororesin having a curable functional group.

(4) The fluororesin powder coating composition according to (1) or (2), wherein the fluororesin (B) is a thermosetting fluororesin having a curable functional group, and a curing agent which reacts with the curable functional group to cure the fluororesin (B) is further contained.

(5) The fluororesin powder coating composition according to (3) or (4), wherein the curable functional group is a functional group selected from a carboxyl group and a glycidyl group.

(6) The fluororesin powder coating composition according to (4) or (5), wherein the outermost shell of the particles (C) comprises a polymer having a functional group which reacts with the curing agent as defined in (4).

(7) The fluororesin powder coating composition according to any one of (1) to (6), wherein the core of the particles (C) comprises a fluororesin (A).

(8) An article having a coating film, wherein the coating film is formed from the fluororesin powder coating composition as defined in any one of (1) to (7).

BEST MODE FOR CARRYING OUT THE INVENTION

The fluororesin powder coating composition of the present invention is a powder coating composition containing a fluororesin (B) as the main component. The fluororesin (B) may be either a thermoplastic fluororesin or a thermosetting fluororesin. It is preferably a thermosetting fluororesin having a curable functional group taking physical properties of a coating film to be formed from the fluororesin powder coating composition of the present invention into consideration.

The fluororesin (B) is preferably one having fluoromonomer units (x) obtained by polymerization of a fluoromonomer (X) having an ethylenic unsaturated group.

The fluoromonomer (X) is preferably a polymerizable monomer having at least one hydrogen atom bonded to a carbon atom which forms the ethylenic unsaturated group substituted by a fluorine atom. It may, for example, be a fluoroolefin such as tetrafluoroethylene, hexafluoropropylene, perfluorobutene-1, perfluorohexene-1, perfluorononene-1, chlorotrifluoroethylene, trifluoroethylene or vinylidene fluoride; or a perfluoro(alkyl vinyl ether) such as perfluoro(methyl vinyl ether), perfluoro(ethyl vinyl ether), perfluoro(propyl vinyl ether) or perfluoro(heptyl vinyl ether). Such fluoromonomers (X) may be used alone or in combination as a mixture of two or more of them. As such a fluoromonomer (X), a fluoroolefin having from 2 to 3 carbon atoms is preferred, and particularly preferred is a fluoroethylene such as tetrafluoroethylene, chlorotrifluoroethylene or vinylidene fluoride.

The fluororesin (B) may have monomer units (y) other than the fluoromonomer units (x). The monomer units (y) are preferably monomer units based on a polymerizable monomer (Y) other than the fluoromonomer (X). Such a polymerizable monomer (Y) may, for example, be a polymerizable monomer having a polymerizable site such as an acryloyl group, a methacryloyl group, a vinyl group, an allyl group or an isopropenyl group. The polymerizable monomer (Y) may, for example, be a vinyl ether, an olefin, an allyl ether, a vinyl ester, an allyl ester, a (meth)acrylate (the (meth)acrylate will hereinafter generically represent acrylate and methacrylate, and the same applies to other acrylic acid derivatives), an isopropenyl ether, an isopropenyl ester, a crotonic acid ester and other polymerizable monomers. Among them, a compound having a $C_{1-15}$ linear, branched or alicyclic alkyl group, is preferred.

Polymerizable monomers (Y) may be used alone or in combination as a mixture of two or more of them. The following compounds may be mentioned as specific polymerizable monomers (Y).

An alkyl vinyl ether such as methyl vinyl ether, ethyl vinyl ether, butyl vinyl ether, isobutyl vinyl ether, cyclohexyl vinyl ether, chloroethyl vinyl ether or a (perfluoroalkyl) vinyl ether; an alkyl isopropenyl ether such as methyl isopropenyl ether; fatty acid isopropenyl ester; an olefin such as ethylene, propylene, 1-butene, isobutylene or cyclohexene; a (perfluoroalkyl) ethylene such as (perfluoromethyl) ethylene or (perfluorobutyl) ethylene; a styrene monomer such as styrene or α-methylstyrene; an alkyl allyl ether such as methyl allyl ether, ethyl allyl ether, butyl allyl ether or cyclohexyl allyl ether; a fatty acid vinyl ester such as vinyl acetate, vinyl propionate, vinyl butyrate, vinyl isobutyrate, vinyl valerate, vinyl hexanoate, vinyl octanoate, Veova 9 and Veova 10 (tradenames, for vinyl esters of branched fatty acids having 9 or 10 carbon atoms, manufactured by Shell Chemical Co.), or vinyl versatate; a fatty acid allyl ester such as allyl propionate or allyl acetate; a (meth)acrylate such as methyl (meth)acrylate, ethyl (meth)acrylate, butyl (meth)acrylate or cyclohexyl (meth)acrylate; a (meth)acrylic acid amide such as (meth) acrylic acid amide; a cyano group-containing monomer such as acrylonitrile or 2,4-dicyanobutane-1; a diene such as isoprene or butadiene, a halogenated olefin such as vinyl chloride or vinylidene chloride (provided that the fluoromonomer (X) is excluded); or a polymerizable monomer having a polyoxyalkylene chain and having a molecular weight of from 100 to 3000, may, for example, be mentioned.

Among them, as the polymerizable monomer (Y), a polymerizable monomer selected from alkyl vinyl ethers, fatty acid vinyl esters, alkyl allyl ethers, fatty acid allyl esters, alkyl isopropenyl ethers and fatty acid isopropenyl esters, is preferred, and particularly preferred is an alkyl vinyl ether.

The fluororesin (B) may have a curing reactive site which reacts with the curing agent. The curing reactive site may be present in the fluoromonomer units (x) or the monomer units (y), however, the fluororesin (B) preferably has monomer units (z) having a curing reactive site other than the fluoromonomer units (x) and the monomer units (y), together with these units (x) and (y). The curing reactive site may, for example, be a functional group such as a hydroxyl group, a carboxyl group, an amide group, an amino group, a nitrile group, a glycidyl group, a halogen atom such as a bromine atom or an iodine atom (provided that a fluorine atom is excluded), or an isocyanate group. The monomer units (z) are preferably obtained by polymerization of a polymerizable monomer (Z) having a curing reactive site.

The following compounds may be mentioned as specific polymerizable monomers (Z).

The polymerizable monomer containing a hydroxyl group may, for example, be allyl alcohol; a hydroxyalkyl vinyl ether such as 2-hydroxyethyl vinyl ether, 3-hydroxypropyl vinyl ether, 4-hydroxybutyl vinyl ether or 4-hydroxycyclohexyl vinyl ether; a hydroxyalkyl allyl ether such as 2-hydroxyethyl allyl ether, 3-hydroxypropyl allyl ether, 4-hydroxybutyl allyl ether or 4-hydroxycyclohexyl allyl ether; a hydroxyalkyl (meth)acrylate such as 2-hydroxyethyl acrylate; an ester of a hydroxyalkylcarboxylic acid with a vinyl alcohol, such as vinyl hydroxyacetate, vinyl hydroxyisobutyrate, vinyl hydroxypropionate, vinyl hydroxybutyrate, vinyl hydroxyvalerate or vinyl hydroxycyclohexylcarboxylate; a hydroxyalkyl allyl ester such as hydroxyethyl allyl ester, hydroxypropyl allyl ester, hydroxybutyl allyl ester, hydroxyisobutyl allyl ester or hydroxycyclohexyl allyl ester.

The polymerizable monomer containing a carboxyl group may, for example, be (meth)acrylic acid, or a carboxyalkyl allyl ester.

The polymerizable monomer containing an amino group may, for example, be an aminoalkyl vinyl ether or an aminoalkyl allyl ether.

The polymerizable monomer containing an amide group may, for example, be (meth)acrylamide or N-methyl(meth) acrylamide.

The polymerizable monomer containing a nitrile group may, for example, be (meth)acrylonitrile.

The polymerizable monomer containing a glycidyl group may, for example, be glycidyl allyl ether or glycidyl (meth) acrylate.

The polymerizable monomer containing an isocyanate group may, for example, be vinyl isocyanate or isocyanate ethyl acrylate.

The polymerizable monomer containing a halogen atom may, for example, be vinyl chloride or vinylidene chloride.

The curing reactive site in the monomer units (z) may be reacted with a specific compound and converted into another curing reactive site. For example, a hydroxyl group may be reacted with a bivalent carboxylic anhydride such as succinic anhydride and converted into a carboxyl group.

The fluororesin (B) is preferably a resin comprising a copolymer obtained by copolymerization of the fluoromonomer (X) in a proportion of from 30 to 70 mol %. Particularly, it is preferably a resin comprising a copolymer obtained by copolymerization of the fluoromonomer (X) in a proportion of from 40 to 60 mol %. The weather resistance adequately excellent as a weather resistant coating material can be obtained when the copolymerization proportion of the fluoromonomer (X) is within the above range.

Now, a fluorinated copolymer composed of the fluoromonomer units (x)/monomer units (y)/monomer units (z) having a curing reactive site (hereinafter sometimes referred to simply as fluorinated copolymer) will be explained as a typical example of the fluororesin (B).

In a case where the fluorinated copolymer is a fluorinated copolymer having a hydroxyl group as the curing reactive site, the hydroxyl value of the fluorinated copolymer is preferably from 10 to 200 mgKOH/g. When the hydroxyl value of the fluorinated copolymer is within the above range, adequate impact resistance can be secured. The hydroxyl value is particularly preferably from 25 to 200 mgKOH/g.

The intrinsic viscosity η of the fluorinated copolymer in tetrahydrofuran at 30° C. is preferably from 0.1 to 2.0 dl/g, particularly preferably from 0.1 to 0.8 dl/g. Adequate impact resistance can be secured when the intrinsic viscosity of the fluorinated copolymer is higher than 0.1 dl/g. Further, adequate toughness can be maintained when it is smaller than 2.0 dl/g. Further, the glass transition temperature (Tg) of the fluorinated copolymer by means of DSC is preferably from 30 to 80° C., particularly preferably from 35 to 60° C. Adequate transparency of the coating film can be secured when Tg is within the above range. Further, adequate solvent resistance can be maintained when it is higher than 30° C.

In a case of a fluorinated copolymer having a hydroxyl group as the curing reactive site, a polyisocyanate resin is preferably employed as the curing agent. As commercially available products, a polyisocyanate resin which is solid at room temperature, comprising IPDI (isophorone diisocyanate) or HMDI (hexamethylene diisocyanate) as the main skeleton and having the isocyanate group blocked with epsilon caprolactam (E-CAP), methyl ethyl ketoxime (MEK-OX), methyl isobutyl ketoxime (MIBK-OX) or triazine (TA), or one obtained by coupling polyisocyanate resins to each other to form an uretodione bond, may be employed. The polyisocyanate resin may, for example, be Creanova B1530, B1065 or BF1540 (tradenames, manufactured by Degussa), TPLS2007 or FGB4553 (tradenames, manufactured by Bayer AG), or Alcure 4470, 4430, 4431 or 4450 (tradenames, manufactured by McWhorter). Further, a melamine resin having a glycoluril structure may also be used as the curing agent. The melamine resin type curing agent may, for example, be Powderlink 1174 (tradename, manufactured by Cytec Industries Inc.) which is a methylated melamine resin type curing agent.

In a case of a fluorinated copolymer having e.g. a carboxyl group or a phenolic hydroxyl group as the curing reactive site, a curing agent containing a glycidyl group is preferably used as the curing agent. The curing agent may, for example, be triglycidyl isocyanurate (TGIC), TM239 (tradename, manufactured by Nissan Chemical Industries, Ltd.) having a methylene group introduced to the glycidyl group part of TGIC, or PT-910 (tradename, manufactured by Ciba) which is a mixture of glycidyl trimellitate and glycidyl terephthalate.

Further, as the curing agent for a condensation reaction, a β-hydroxyalkylamide type curing agent may be used. Such a curing agent may be Primid XL-552 (tradname, manufactured by EMS-PRIMID).

In a case of a fluorinated copolymer having a glycidyl group as the curing reactive site, a dibasic acid type curing agent, an amine type curing agent, etc. may be preferably used. Specifically, dodecanoic diacid, cyclic amidine, polyhydrazide or a polymer having an acid introduced may be mentioned.

In the present invention, the proportion of the above curing agent is not particularly limited, however, the molar ratio of functional groups of the curing agent based on the number of mols of the curing reactive site of the fluorinated copolymer is usualy preferably from 0.7 to 1.3, more preferably from 0.8 to 1.2, particularly preferably from 0.9 to 1.2, in a case of the curing agent except for the cyclic amidine. In a case of the cyclic amidine, said molar ratio is preferably from 0.1 to 0.7, more preferably from 0.2 to 0.6, particularly preferably from 0.3 to 0.5.

For the fluororesin powder coating composition of the present invention, a pigment which is conventionally employed for powder coating materials may be used. In the present invention, a pigment having good weather resistance is preferred so that the resin characteristics can be provided at the maximum level. As such a pigment, a metal oxide pigment such as iron oxide, cobalt oxide or bismuth oxide, an orgnaic pigment such as perylene or diketopyrrolopyrrole, or titanium oxide subjected to a surface treatment may, for example, be mentioned.

In the present invention, also an extender pigment or an anti-rusting pigment may, for example, be used in an amount not to impair the weather resistance performance. As the amount of addition, at most 10 mass %, preferably at most 5 mass %, may be adopted.

For the fluororesin powder coating composition of the present invention, other additives which are conventionally used for coating materials may optionally be used. Specific examples of such other additives include an antioxidant, an anti-sagging agent, an ultraviolet absorber; a light stabilizer, a surface adjustor, a slipping agent and a catalyst. The amounts (by mass) of other additives are suitably selected within a range of from about 5 to about 150 parts per 100 parts of the fluororesin (B).

Further, in the present invention, another resin other than the fluororesin (B), such as a polyester resin, an acrylic resin or an epoxy resin may be used in combination within a range not to impair the weather resistance performance of the fluororesin (B).

The fluororesin powder coating composition of the present invention is characterized in that particles (C) having a core/shell structure and having an average particle size of from 0.01 to 2.5 μm are contained in an amount of from 0.1 to 10 parts by mass per 100 parts by mass of the fluororesin (B). Here, the average particle size is a weight average particle size measured by means of dynamic light scattering.

The core/shell structure in the present invention comprises a core and at least one shell comprising another resin other than the resin forming the core, wherein the number of shell may be one or more. It is required of the particles (C) having a core/shell structure of the present invention that at least one shell and/or the core comprises a fluorinated polymer (A). By using such particles (C), a coating film formed from the fluororesin powder coating composition of the present invention has excellent impact resistance while it has superior weather resistance and gloss of a fluororesin.

The fluorinated polymer (A) of the present invention is one having fluoromonomer units (x) obtained by polymerization of a fluoromonomer (X) having an ethylenic unsaturated group, and it may be the same polymer as the fluororesin (B). Particularly, a flexible fluorinated polymer is preferred. As the flexible fluorinated polymer, a polymer having an elastic modulus at 25° C. of at most 600 MPa is preferred, and a binary copolymer of tetrafluoroethylene (hereinafter referred to as TFE) and propylene (hereinafter referred to as Pr), a binary copolymer of vinylidene fluoride (hereinafter referred to as VdF) and hexafluoropropylene (hereinafter referred to as HFP), a ternary copolymer of VdF, HFP and TFE, a ternary copolymer of TFE, Pr and ethylene, a blocked copolymer having a fluororesin component and a fluororubber component blocked, or a graft copolymer having a fluororesin component graft-polymerized to a fluororubber component, may, for example, be mentioned.

In order to further increase the impact resistance, it is preferred that the core comprises the above flexible fluorinated polymer, and the shell comprises a polymer having hardness higher than that of the core.

As the resin having hardness higher than that of the core, an acrylic polymer is preferred in view of availability and physical properties. In a case where the number of shell is two or more, it is preferred that at least the outermost layer comprises a resin having hardness higher than that of core. As the acrylic polymer, a polymer or a copolymer of a conventional acrylic monomer may be mentioned. Such an acrylic monomer may, for example, be a (meth)acrylate such as methyl (meth)acrylate, ethyl (meth)acrylate, butyl (meth)acrylate or cyclohexyl (meth)acrylate, a fluoroalkyl (meth)acrylate, a (meth)acrylamide, such as (meth)acrylamide, or acrylonitrile.

The particles (C) of the present invention may be produced by any conventional method. For example, so-called seed polymerization wherein a monomer which forms the shell is polymerized by emulsion polymerization on the outer shell of particles which form the core (hereinafter sometimes referred to as core particles) which are dispersed in water by means of an appropriate emulsifier, may be mentioned. It is preferred that the core particles themselves are also produced by a conventional emulsion polymerization. In a case where the core particles themselves are produced by emulsion polymerization, the monomer which forms the shell may be successively added to the system after completion of the polymerization to carry out the seed polymerization. In this case, an emulsifier may further be added. The size of the core particles and the size of the particles (C) can be adjusted by the amount of the emulsifier added. The particle size tends to be small when the amount of the emulsifier is increased, and the particle size tends to be large when the amount of the emulsifier is decreased.

With respect to the size of the particles (C) of the present invention, the weight average particle size as measured by dynamic light scattering is required to be within a range of from 0.01 to 2.5 μm, and it is preferably from 0.05 to 2.0 μm in order to obtain an adequate effect and to maintain continuity of the coating film. It is more preferably from 0.1 to 1.5 μm.

Further, in a case where the fluororesin (B) has a curable functional group, and a curing agent is incorporated in the fluororesin powder coating composition of the present invention, the outermost layer of the particles (C) preferably comprises a polymer having a functional group which reacts with the curing agent, whereby the curing agent and the functional group of the particles (C) react with each other when the coating film is formed, and physical properties of the coating film further improve. The outermost layer of the particles (C) is preferably an acrylic polymer also from such a viewpoint that various functional groups can be introduced.

It is required that in the fluororesin powder coating composition of the present invention, the particles (C) are contained in an amount of from 0.1 to 10 parts by mass per 100 parts by mass of the fluororesin (B). The particles (C) are contained preferably in an amount of from 0.5 to 10 parts by mass, in order to further improve impact resistance of the coating film. They are contained in an amount of furthermore preferably from 1 to 8 parts by mass, particularly preferably from 1 to 6 parts by mass.

The fluororesin powder coating composition of the present invention may be produced by a conventional method. For example, the fluororesin (B) and the particles (C), and as the case requires, a curing agent, a pigment and other additives are roughly mixed by a mixer such as a Henschel mixer, followed by heat melt kneading by a twin screw, single screw or planetary type extruder and cool rolling by a cool roll. Thereafter, rotary shear pulverization by a pin mill or the like, pulverization by means of an impact type pulverizer such as a jet mill, etc. are carried out. The obtained powders are classified by a mesh or by an air separator or the like to obtain a desired powdery fluororesin powder coating composition. This is a common production process.

The size of the powder is not particularly limited, but preferably from 15 to 200 μm, more preferably from 20 to 150 μm, particularly preferably from 20 to 100 μm, as the 50% volume average particle size. Here, the 50% volume average particle size is a particle size at the 50% occupying ratio of the total when volume occupying ratios at the respective particle sizes are accumulated.

The fluororesin powder coating composition of the present invention may be coated by means of an appropriate powder coating apparatus, followed by baking in a certain temperature atmosphere to obtain a coating film. The obtained coating film has excellent impact resistance while it maintains superior weather resistance performance and gloss of a fluororesin powder coating material.

By means of the fluororesin powder coating composition of the present invention, it is possible to form a coating film having a superior weather resistance performance, having high gloss and having impact resistance also, on the surface of various articles. The material for such various articles may, for example, be an inorganic material such as concrete, ALC (autoclaved light weight concrete), GRC (glass fiber-reinforced concrete), CFRC (carbon fiber-reinforced concrete), stone, slate or glass, an organic material such as rubber or a resin such as an acrylic resin, a polycarbonate resin, a vinyl chloride resin or a polyethylene resin, a metal material such as aluminum, copper, brass, titanium, iron, stainless steel, a zinc steel plate or a steel plate, wood material, or an organic inorganic composite material such as FRP (glass fiber-reinforced synthetic resin) or CFRP (carbon fiber-reinforced synthetic resin).

The fluororesin powder coating composition of the present invention may be directly coated on an article made of such a material, or the coating may be carried out after applying surface treatment such as a primer or after applying under coating. In the case of a material where the adhesion tends to be inadequate when directly coated, it is preferred to carry out the coating after applying surface treatment such as sanding or under coating treatment.

The fluororesin powder coating composition of the present invention may be coated, for example, on the surface of the following articles. Such articles may, for example, be transportation instruments such as automobiles, electric cars, helicopters, ships, bicycles, snow vehicles, ropeways, lifts, hovercrafts or motor cycles, building materials such as sashes, shutters, storage tanks, doors, balconies, building external panels, roof materials, stairs, skylights or concrete fences, road materials such as exterior walls of buildings, guard rails, pedestrian walkways, sound insulating walls, signs, express way side walls, elevated railroad tracks or bridges, plant components such as tanks, pipes, towers or chimneys, agricultural installations such as vinyl houses, green houses, silos or agricultural sheets, communication installations such as power poles, power transmission towers or parabola antennas, electric instruments such as electric wiring boxes, light equipments, air conditioners or washing machines, and their coverings, monuments, gravestones, paving materials, windproof sheets, water-proof sheets, or curing sheets for construction.

The particles (C) of the present invention have an effect to improve impact resistance also when added to another powder coating material other than the powder coating material containing a fluororesin as the main component, such as a polyester powder coating material, an acrylic powder coating material or an epoxy powder coating material, and may be applied to a conventional powder coating composition comprising such another powder coating material. However, a coating film comprising such a conventional powder coating composition can not have superior weather resistance performance and gloss of the fluororesin as in the present invention.

EXAMPLES

Now, the present invention will be described in further detail with reference to Examples. Examples 1 to 4 represent Synthesis Examples, Examples 5 and 6 represent Examples of the present invention, and Examples 7 to 11 represent Comparative Examples. In the following Examples, "parts" and "%" are based on mass unless otherwise specified.

Example 1

Into an autoclave made of stainless steel, equipped with a stirrer and having an internal capacity of 2.5 L, 860 g of ion-exchanged water, 35 g of allyl glycidyl ether, 46.6 g of tert-butyl alcohol and 26.2 g of potassium carbonate were charged, and deaeration by means of a vacuum pump and pressurization by means of nitrogen gas were repeatedly carried out to remove the air. Then, 72 g of tetrafluoroethylene, 1.1 g of propylene and 1.4 g of ethylene were introduced, and then the autoclave was heated so that the temperature in the autoclave was 70° C. The pressure was 1.34 MPa at this point. Then, 2 mL of a 25% ammonium persulfate aqueous solution was added to initiate the polymerization, and along with the progress of the polymerization, 30 cc of the 25% ammonium persulfate aqueous solution was continuously added over a period of 8 hours. Further, along with the progress of the polymerization, a mixed gas of tetrafluoroethylene/propylene/ethylene (50/25/25 mol %) was introduced to keep the pressure in the autoclave. 8 hours later, when the supply of the 25% ammonium persulfate aqueous solution was stopped, the above mixed gas was introduced in an amount of 250.5 g in total. The supply of the mixed gas was stopped, the autoclave was cooled with water so that its temperature reached room temperature, and then unreacted monomers were purged. The autoclave was opened to obtain an aqueous dispersion having a solid content concentration of 38%.

The aqueous dispersion was put in a 5 L glass flask equipped with a stirrer, and further, 50 g of n-butyl methacrylate, 32 g of tert-butyl methacrylate, 12 g of hydroxyethyl methacrylate, 90 g of ion-exchanged water and an emulsifier mixed liquid comprising 0.09 g of sodium lauryl sulfate and 0.5 g of Newcol 1120 (tradename for nonionic emulsifier, manufactured by Nippon Nyukazai Co., Ltd.) were added. Then, the atmosphere in the flask was replaced by nitrogen gas, followed by heating to 65° C. 0.2 g of ammonium persulfate was added in a nitrogen gas atmosphere, followed by heating and stirring for 5 hours to carry out polymerization. Then, the flask was cooled to room temperature, 1 N hydrochloric acid was added until pH became 3, and polymerized particles were agglomerated and repeatedly washed with ion-exchanged water, followed by drying at 40° C. to obtain core/shell particles P. The weight average particle size of the core/shell particles P was measured by means of dynamic light scattering by using a laser zeta electrometer ELS-8000 manufactured by Otsuka Electronics Co., Ltd., and it was 0.5 µm.

Example 2

The same operation as in Example 1 was carried out except that the emulsifier mixed liquid of Example 1 was changed to an emulsifier mixed liquid comprising 0.09 g of sodium lauryl sulfate and 10 g of Newcol 1120 (tradename for nonionic emulsifier, manufactured by Nippon Nyukazai Co., Ltd.) to obtain core/shell particles Q having an average particle size of 0.04 µm.

Example 3

The same operation as in Example 1 was carried out except that the emulsifier mixed liquid of Example 1 was changed to an emulsifier mixed liquid comprising 0.09 g of sodium lauryl sulfate and 0.02 g of Newcol 1120 (tradename for nonionic emulsifier, manufactured by Nippon Nyukazai Co., Ltd.) to obtain core/shell particles R having an average particle size of 3 µm.

Example 4

Synthesis of Fluororesin
Into a pressure resistant reactor made of stainless steel, equipped with a stirrer and having an internal capacity of 3 L, 1000 g of xylene, 350 g of cyclohexyl vinyl ether (CHVE), 50 g of ethyl vinyl ether (EVE), 100 g of 4-hydroxybutyl vinyl ether (HBVE), 10 g of calcium carbonate and 0.7 g of perbutyl perpivalate (PBPV) were charged, and dissolved oxygen in the liquid was removed by solidification/deaeration by liquid nitrogen. Then, 500 g of chlorotrifluoroethylene (CTFE) was introduced, and the temperature was gradually raised, and the polymerization reaction was carried out while maintaining the temperature at 65° C. 10 Hours later, the reactor was cooled with water to stop the reaction. This reaction solution was cooled to room temperature, and then unreacted monomers were purged. The obtained reaction solution was filtrated through diatomaceous earth to remove undissolved solid substances and to obtain a fluorinated copolymer solution having a solid content concentration of 50%. The solution was dried under reduced pressure to obtain a solid fluorinated copolymer. Of the fluorinated copolymer, the glass transition temperature was 55° C., and the hydroxyl value was 38 mgKOH/g.

Example 5

580 g of the fluorinated copolymer obtained in Example 4, 110 g of Creanova B1530 (tradename for a polyisocyanate resin comprising IPDI as the main skeleton and blocked with E-CAP, manufactured by Degssa) (NCO in the polyisocyanate resin/OH in the fluorinated copolymer A=1.0), 4 g of benzoin, 10 g of BYK-364P (tradename for an acrylic acid oligomer type leveling agent, manufactured by BYK-Chemie) and 50 g of the core/shell particles P obtained in Example 1 were put into a high speed mixer and mixed for 1 minute, followed by kneading by a twin screw kneader (manufactured by Prism) adjusted to a temperature of 120° C. The discharged kneaded product was rolled by a cool roll and then crushed by a jaw crusher, then pulverized by means of a pin mill, and classified by a 150 mesh net to obtain a fluororesin powder coating composition having a 50% volume average particle size of 35 µm.

The obtained fluororesin powder coating composition was coated on the surface of a chromate-treated aluminum plate at a discharge rate of 80 g/min at an applied voltage of −60 kv by means of a powder coating material electrostatic coating apparatus (PG-1 coating machine manufactured by Landsberg) so that the coated film thickness would be 50 µm, followed by baking to form a coating film. Here, the baking was carried out for 20 minutes in an atmosphere of 200° C. by means of a hot air circulation system dryer. As the evaluation of the outer appearance of the coating film, measurement of a 60° specular gloss value and a 20° specular gloss value was carried out. As the physical properties of the coating film, the Erichsen value (the extrusion distance at which cracks on the coating film occur) by means of break distance method of JIS K5400 and impact resistance by means of Dupont of JIS K5400 (maximum drop height at which no crack or peeling on the coating film occurs) were evaluated. Further, as the evaluation of the weather resistance, the 60° specular gloss value maintaining rate of the coating film after 5000 hours of an accelerated weather resistance test by a Sunshine Weather-O-Meter, was measured. The evaluation results are summarized in Table 1.

Example 6

The same operation as in Example 5 was carried out except that the core/shell particles P were changed to the core/shell particles Q to obtain a fluororesin powder coating composition having a 50% volume average particle size of 35 µm. By using this composition, a coating film was formed and the coating film was evaluated in the same manner as in Example 5. The evaluation results are summarized in Table 1.

Example 7

The same operation as in Example 5 was carried out except that the amount of the core/shell particles P was changed to 2 g to obtain a fluororesin powder coating composition having a 50% volume average particle size of 35 µm. By using this composition, a coating film was formed and the coating film was evaluated in the same manner as in Example 5. The evaluation results are summarized in Table 1.

Example 8

The same operation as in Example 5 was carried out except that the amount of the core/shell particles P was changed to 130 g to obtain a fluororesin powder coating composition having a 50% volume average particle size of 35 µm. By using this composition, a coating film was formed and the coating film was evaluated in the same manner as in Example 5. The evaluation results are summarized in Table 1.

Example 9

The same operation as in Example 5 was carried out except that 50 g of the core/shell particles P was changed to 50 g of STAPHYLOID AC4030 (tradename for non-fluorine type particles having a core/shell structure, manufactured by GANZ CHEMICAL CO., LTD.) to obtain a fluororesin powder coating composition having a 50% volume average particle size of 35 µm. By using this composition, a coating film was formed and the coating film was evaluated in the same manner as in Example 5. The evaluation results are summarized in Table 1.

Example 10

The same operation as in Example 5 was carried out except that the core/shell particles P were not used, to obtain a fluororesin powder coating composition having a 50% volume average particle size of 35 µm. By using this composition, a coating film was formed and the coating film was evaluated in the same manner as in Example 5. The evaluation results are summarized in Table 1.

Example 11

The same operation as in Example 5 was carried out except that the core/shell particles R were used instead of the core/shell particles P to obtain a fluororesin powder coating composition having a 50% volume average particle size of 35 µm. By using this composition, a coating film was formed and the coating film was evaluated in the same manner as in Example 5. The evaluation results are summarized in Table 1.

TABLE 1

|  | 60° gloss value (%) | 20° gloss value (%) | Impact resistance (cm) | Erichsen value (mm) | Weather resistance (%) |
| --- | --- | --- | --- | --- | --- |
| Ex. 5 | 81 | 47 | 50 | 6.0 | 91 |
| Ex. 6 | 79 | 43 | 50 | 5.7 | 90 |
| Ex. 7 | 80 | 45 | 40 | 4.1 | 92 |
| Ex. 8 | 65 | 32 | 30 | 3.7 | 91 |
| Ex. 9 | 75 | 25 | 45 | 5.0 | 68 |
| Ex. 10 | 82 | 48 | 40 | 4.3 | 90 |
| Ex. 11 | 75 | 44 | 25 | 3.6 | 90 |

INDUSTRIAL APPLICABILITY

A coating film can be formed by coating the fluororesin powder coating composition of the present invention on the surface of various articles by means of a conventional powder coating apparatus, usually followed by baking appropriately. The coating film has improved impact resistance while maintaining superior weather resistance performance and gloss of a fluororesin. Further, its strength as represented by the Erichsen value is high.

The entire disclosure of Japanese Patent Application No. 2002-12760 filed on Jan. 22, 2002 including specification, claims, drawings and summary is incorporated herein by reference in its entirety.

What is claimed is:

1. A fluororesin powder coating composition comprising: a fluororesin (B) as the main component; and particles (C); wherein
    particles (C) are present in an amount of from 0.1 to 10 parts by mass per 100 parts by mass of the fluororesin (B),
    particles (C) have a weight average particle size measured by dynamic light scattering of from 0.01 to 2.5 µm, and
    particles (C) comprise a core/shell structure comprising a core layer and at least one shell layer wherein the core comprises a fluorinated polymer (A), and the at least one shell layer consists of an acrylic polymer.

2. The fluororesin powder coating composition according to claim 1, wherein the fluororesin (B) is a resin comprising a copolymer obtained by copolymerization of a fluoromonomer having an ethylenic unsaturated group in a proportion of from 30 to 70 mol %.

3. The fluororesin powder coating composition according to claim 1, wherein the fluororesin (B) is a thermosetting fluororesin having a curable functional group.

4. The fluororesin powder coating composition according to claim 3, wherein the fluororesin powder coating composition further comprises a curing agent which reacts with the curable functional group to cure the fluororesin (B).

5. The fluororesin powder coating composition according to claim 3, wherein the curable functional group is a functional group selected from the group consisting of a carboxyl group and a glycidyl group.

6. The fluororesin powder coating composition according to claim 4, wherein the at least one shell layer of the particles (C) consists of an acrylic a polymer having a functional group which reacts with the curing agent.

7. The fluororesin powder coating composition according to claim 1, wherein the core of the particles (C) comprises a fluororesin (A).

8. An article comprising a coating film, wherein the coating film is formed from the fluororesin powder coating composition as defined in claim 1.

9. The fluororesin powder coating composition according to claim 1, wherein the at least one shell layer comprising an acrylic polymer has a hardness higher than the hardness of the core.

10. The fluororesin powder coating composition of claim 1 wherein the acrylic polymer is at least one selected from the group consisting of a polymethyl(meth)acrylate, a polyethyl (meth)acrylate, a poly(butyl)methacrylate, a polycyclohexyl (meth)acrylate, a polyfluoroalkyl(meth)acrylate, a poly (meth)acrylamide, polyacrylonitrile and copolymers thereof.

11. The fluororesin powder coating composition of claim 2, wherein the fluoromonomer having an ethylenic unsaturated group is at least one selected from the group consisting of tetrafluoroethylene, hexafluoropropylene, perfluorobutene-1, perfluorohexene-1, perfluorononene-1, chlorotrifluoroethylene, trifluoroethylene, vinylidene fluoride, perfluoro(methyl vinyl ether), perfluoro(ethyl vinyl ether), perfluoro(propyl vinyl ether) and perfluoro(heptyl vinyl ether).

12. The fluororesin powder coating composition of claim 2, wherein the fluororesin (B) further comprises monomer units selected from the group consisting of alkyl vinyl ethers, fatty acid vinyl esters, alkyl allyl ethers, fatty acid allyl esters, alkyl isopropenyl ethers and fatty acid isopropenyl esters.

13. The fluororesin powder coating composition of claim 1, further comprising a pigment.

14. The fluororesin powder coating composition of claim 13, wherein the pigment is at least one selected from the group consisting of iron oxide, cobalt oxide, bismuth oxide, perylene, diketopyrrolopyrrole and titanium oxide.

15. The fluororesin powder coating composition of claim 1, further comprising at least one additive selected from the group consisting of an antioxidant, an anti-sagging agent, an ultraviolet absorber, a light stabilizer, a surface adjustor, a slipping agent and a catalyst.

16. The article as defined in claim 8 wherein the coating film is formed on at least one surface of the article.

17. The article of claim 16, wherein the at least one surface coated with the fluororesin powder coating composition comprises a material selected from the group consisting of concrete, autoclaved light weight concrete, glass fiber-reinforced concrete, carbon fiber-reinforced concrete, stone, slate, glass, rubber, acrylic resin, polycarbonate resin, vinyl chloride resin, polyethylene resin, aluminum, copper, brass, titanium, iron, stainless steel, zinc steel, steel, wood material, and organic inorganic composite material.

18. The fluororesin powder coating composition according to claim 7, wherein the fluororesin (A) is a flexible fluorinated polymer and an elastic modulus of the flexible fluorinated polymer is at most 600 MPa at 25° C.

19. The fluororesin powder coating composition according to claim 18, wherein the flexible fluorinated polymer is selected from the group consisting of a binary copolymer of tetrafluoroethylene and propylene, a binary copolymer of vinylidene fluoride and hexafluoropropylene, a ternary copolymer of vinylidene fluoride, hexafluoropropylene and tetrafluoroethylene, a ternary copolymer of tetrafluoroethylene, propylene and ethylene, a blocked copolymer having a fluororesin component and a fluororubber component blocked, and a graft copolymer having a fluororesin component graft-polymerized to a fluororubber component.

* * * * *

UNITED STATES PATENT AND TRADEMARK OFFICE
CERTIFICATE OF CORRECTION

| | |
|---|---|
| PATENT NO. | : 7,414,084 B2 |
| APPLICATION NO. | : 10/893347 |
| DATED | : August 19, 2008 |
| INVENTOR(S) | : Yamauchi et al. |

It is certified that error appears in the above-identified patent and that said Letters Patent is hereby corrected as shown below:

On the title page, Item (75), the first Inventor's name is incorrect. Item (75) should read:

-- (75) Inventors: Masaru Yamauchi, Chiba (JP); Sho Masuda, Chiba (JP); Masao Unoki, Chiba (JP) --

Signed and Sealed this

Ninth Day of December, 2008

JON W. DUDAS
*Director of the United States Patent and Trademark Office*